Patented July 25, 1950

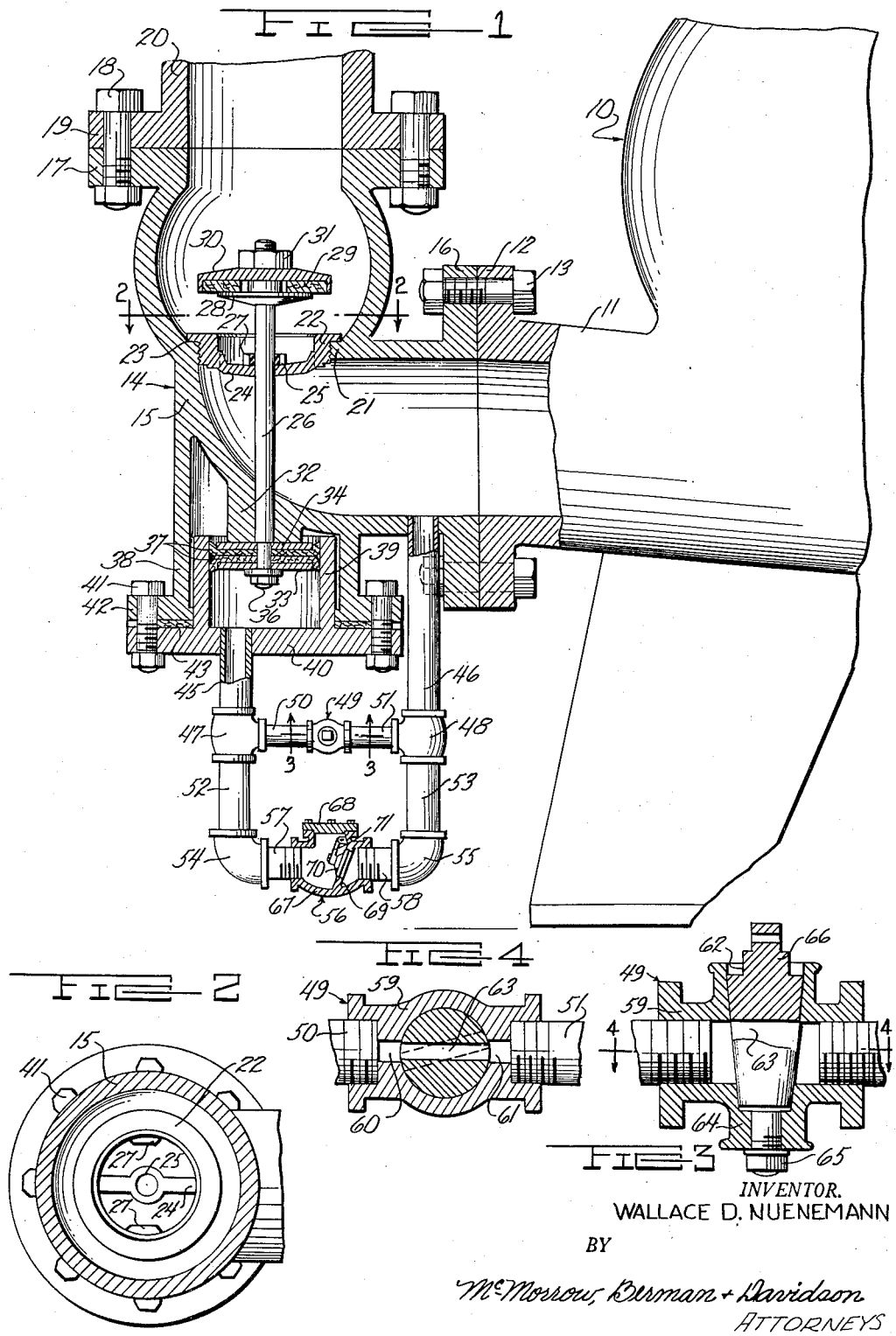

2,516,247

UNITED STATES PATENT OFFICE 2,516,247

NONRETURN FLOW VALVE

Wallace D. Nuenemann, Brooklyn, N. Y., assignor to Sadye Florence Gelb, Brooklyn, N. Y.

Application February 8, 1949, Serial No. 75,197

2 Claims. (Cl. 137—139)

1

This invention relates to non-return flow or check valves, and more particularly to such a valve connectible with the outlet of a liquid pump, especially a centrifugal pump, to hold the hydraulic head established by the pump when operation of the pump is discontinued.

It is among the objects of the invention to provide an improved, non-return flow or check valve which is fully automatic in operation, which includes cushioning or impact-reducing means for its movable component to eliminate impact or hammering of the valve and the valve-sustained hydraulic head, which has substantially no delay in opening and an adjustably-controlled delay in closing, so that there is substantially no impedance to the pump out-put, and a controlled, gradual cutting off of the back flow when the pump operation is discontinued, which is simple and durable in construction, economical to manufacture, and which can be quickly and easily assembled with, and disassembled from conventional, centrifugal pumps and pump outlet conduits.

Other objects and advantages will become apparent from a consideration of the following description and the appended claims in conjunction with the accompanying drawing, wherein:

Figure 1 is a longitudinal, medial cross-section through a non-return flow valve illustrative of the invention, a connected centrifugal pump being diagrammatically shown in side elevation;

Figure 2 is a transverse cross-section on the line 2—2 of Figure 1;

Figure 3 is a longitudinal cross-section of a manually-adjustable, variable restriction valve and is taken substantially on the line 3—3 of Figure 1; and Figure 4 is a longitudinal cross-section on the line 4—4 of Figure 3.

With continued reference to the drawing, a conventional centrifugal pump is generally indicated at 10, and is provided with an outlet fitting 11 having an external, annular flange 12 provided with apertures for the connecting bolts 13, and the numeral 14 generally indicates a non-return flow or check valve connected to the outlet of the centrifugal pump.

As is well known to the art, a centrifugal pump, when operating, will build up sufficient hydraulic pressure to force liquid in one direction through the pump-connected conduits, but when operation of the pump is discontinued, the pump itself will not prevent the return flow of liquid in the opposite direction. For this reason, it is necessary to connect a check or non-return flow valve

2 between the pump outlet and the pump outlet conduit if it is desired to maintain a hydraulic head at the outlet side of the pump. Such a valve will automatically open when subjected to pump pressure to permit flow of liquid from the pump outlet to the pump outlet conduit, and will be automatically closed by the back flow of liquid from the outlet conduit through the pump when operation of the pump is discontinued. Where the pump operates against any considerable hydraulic head, the back flow of liquid, when operation of the pump is discontinued, closes the valve sharply and violently, producing heavy shocks and water-hammer which causes rapid deterioration of the valve, loosening of the pipe fittings in the liquid conduit leading from the pump, unpleasant noise and vibration and other undesirable effects. The present invention, therefore, contemplates the provision of means for controlling the closing of such a check or non-return flow valve in a manner which will eliminate the impact and hammer incident to closing of the valve, but will not interfere, in any way, with the opening of the valve by pump-induced liquid pressure.

The valve 14 comprises a hollow, elbow-shaped valve body 15, having at one end an external, annular flange 16 apertured to receive the bolts 13 for connecting this inlet end of the valve body to the outlet fitting 11 of the pump 10, and having at its opposite end an external, annular flange 17 apertured to receive connecting bolts 18 by means of which this outlet end of the valve is connected to the external, annular flange 19 of a pump outlet conduit 20.

Substantially midway between the flanges 16 and 17, the valve body is provided with an internal bead or flange 21 which is screw threaded around a circular aperture which receives the annular valve seat 22. This valve seat has a flat, upper surface and an external, annular flange 23 supporting the seat in the bead 21, and is provided with a diametrically-extending strut 24 which carries at its mid-length location an apertured boss 25 constituting a guide for slidably receiving the elongated, cylindrical valve stem 26. A pair of diametrically-opposed lugs 27 is provided in the valve seat to provide wrench-engaging means for threading the valve seat into and out of the valve seat-receiving aperture provided in the bead 21.

A valve head is mounted on the valve stem 26 above the valve seat 22, and comprises a lower, fixed washer 28, an annular washer or gasket 29 of relatively soft material, such as fiber or rubber, supported upon the fixed washer 28, a cup-shaped washer 30 overlying the gasket 29, and a nut 31 threaded onto the externally screw-threaded upper end of the valve stem to compress the gasket 29 between the washers 28 and 30.

Below the valve seat 22, and at the opposite side of the valve seat from the valve head, the valve body is provided with an apertured, outwardly-extending boss 32 through which the valve stem 26 slidably extends, and a piston is secured on the valve stem at the outer end of the boss 32. The piston may comprise a pair of opposed metal washers 33 and 34 secured on a reduced end portion of the stem 26 by a nut 36, and a pair of leather cups 37 clamped between the washers.

A cylinder 38 is formed on the valve body surrounding the boss 32, and a piston-receiving cylinder 39 is received in the cylinder 38 and provided with an end wall 40 at its outer end, which end-wall projects marginally beyond the cylinder 39 to constitute an annular, external flange apertured to receive bolts 41 which extend through respective apertures in an external, annular flange 42 on the lower or outer end of the cylinder 38 to secure the cylinder 39 to the cylinder 38. Suitable packing 43 is preferably interposed between the flange 42 and the outer portion of the end-wall 40 to provide a fluid-tight seal between the cylinders 39 and 38. There is sufficient clearance between valve stem 26 and boss 32 to prevent blocking movement of the piston by fluid trapped in the space surrounding boss 32, and the valve stem at one side of the piston provides a sufficient area differential at the opposite sides of the piston to insure movement of the piston in a valve-opening direction.

A tubular conduit 45 extends through the end-wall 40 of cylinder 39 and projects downwardly therefrom, and a corresponding tubular conduit 46 is secured in the valve body 15 adjacent the inlet end of the valve body and communicates with the interior of the latter. This tubular conduit 46 also extends downwardly from the valve body and the tubular conduits 45 and 46 are provided, on their lower ends, with respective T-fittings 47 and 48 substantially in alignment with each other. A variable restriction plug valve, generally indicated at 49, and illustrated in detail in Figures 3 and 4, is disposed between the T-fittings 47 and 48 and connected thereto by respective nipples 50 and 51.

Respective nipples 52 and 53 extend downwardly from the T-fittings 47 and 48, and respective elbows 54 and 55 are secured on the lower ends of the nipples 51 and 52. A check valve, generally indicated at 56, is disposed between the elbows 54 and 55 and connected thereto by respective nipples 57 and 58.

The variable restriction valve 49 comprises an elongated valve body 59 having respective screw-threaded sockets in its opposite ends receiving the adjacent screw-threaded ends of the nipples 50 and 51, and a tapered, transverse bore disposed between the sockets and connected thereto by restricted passages 60 and 61. A tapered valve plug 62 is rotatably received in the transverse bore in the valve body 59 and provided with a transverse opening 63 which can be moved into and out of registry with the respective passages 60 and 61 by rotation of the plug. When the plug is in position to bring its transverse opening 63 into full registry with the passages 60 and 61, as illustrated in full lines in Figure 4, the valve 49 is fully opened, and when the plug is rotated to move its opening 63 somewhat out of registry with the passages 60 and 61, as indicated in dotted lines in Figure 4, the liquid passage through the plug valve is restricted. The smaller end of the plug 62 is provided with a reduced, externally screw-threaded extension which projects through an apertured boss 64 on the valve body, and receives a nut 65 for holding the plug firmly in the valve body, and the plug is provided on its larger end with a non-circular extension 66 which may be engaged by a suitable handle or tool to rotate the plug and thereby vary the liquid passage therethrough.

The check valve 56 comprises a hollow, elongated valve body 67 having in its opposite ends respective sockets receiving the screw-threaded ends of the nipples 57 and 58 and having in one side a flanged opening closed by a detachable cover plate 68. An annular valve seat 69 is formed in the valve body 67 between the end sockets and a flap valve 70 is supported by an arm 71 pivotally connected to the inside of the valve body.

The check valve 56 will permit substantially free flow of liquid from the intake end of the main valve body 14 into the cylinder 39 when the main valve body is filled with liquid under pump-induced pressure, but will preclude a flow of liquid from the cylinder 39 back into the main valve body. The variable restriction valve 49, however, will permit flow of liquid at a predetermined rate from the cylinder 39 back into the intake end of the main valve body when the pump-induced pressure on the liquid in the main valve body is discontinued, thereby permitting the piston 33 to move downwardly in the cylinder 39, and the valve head to close against the valve seat 22, thereby closing the valve, but retarding the downward movement of the valve head sufficiently to prevent any impact or jar when the valve head strikes the valve seat.

As the return flow of liquid through the variable restriction valve 49 is much slower than the flow of liquid through the check valve 56, the nipples 50 and 51 may be much smaller than the nipples 52, 53, 57 and 58 to provide adequate flow capacity without waste of material.

It will be noted that the opening in the outlet end of the main valve body 15 is somewhat larger than the valve head and the annular valve seat 22, so that these parts can be readily removed and replaced for servicing the valve, and that the cylinder 39 is readily removable from the valve body and the piston 33 from the valve stem for the same purpose.

While the interior of the piston 39 has been shown as hydraulically connected with the interior of the main valve body 15 near the inlet end of the latter by pipe nipples and fittings, it is to be understood that other suitable conduits may be provided, such as liquid passages through the walls of the cylinders 38 and 39, and that other forms of check valves and variable restriction valves may be utilized without in any way exceeding the scope of the invention.

In the hydraulically-damped, non-return flow valve of the present invention the valve housing has a simple elbow shape involving but a single change in the flow direction of liquid passing therethrough, which change is smooth and gradual so as to produce negligible frictional resistance to flow, and the hydraulic damping means is disposed entirely outside of the valve body so that it does not interfere in any way with the flow of liquid through the valve and is directly in line with the movement of the valve stem and valve head so that there will be no binding or other malfunctioning of the valve.

While the non-return flow valve of the invention has been illustrated as connected to the outlet fitting of a centrifugal pump, it is to be understood that this valve may also be interposed in any portion of a hydraulic system where its presence is considered to be advantageous.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a non-return flow valve including a hollow, elongated valve body having an inlet end and an outlet end, an annular valve seat disposed transversely of said body between the ends thereof and having a centrally-disposed valve stem guide, a valve stem slidable in said guide and a valve head on one end of said stem engageable with said valve seat to close said valve, means carried by said valve body for controlling closing movements of said valve head to avoid impact of said head on said seat comprising an apertured boss on said valve body at the opposite side of said valve seat from said valve head and slidably receiving said valve stem, a cylindrical formation on said valve body surrounding said boss, a piston-receiving cylinder received in and detachably secured to said cylindrical formation, a piston secured on the end of said valve stem opposite said valve head and slidably received in said piston receiving cylinder, a pair of conduits connected between the interior of said cylinder and the interior of said valve body at the inlet side of said valve seat, a check valve in one of said conduits providing flow of liquid from said valve body at the inlet side of said valve seat into said cylinder but precluding return flow of liquid from said cylinder to said valve body, and a flow-restricting device in the other of said conduits providing flow of liquid at a restricted rate from said cylinder to said valve body at the inlet side of said valve seat.

2. In a non-return flow valve including a hollow, elongated valve body having an inlet end and an outlet end, an annular valve seat disposed transversely of said body between the ends thereof and having a centrally-disposed valve stem guide, a valve stem slidable in said guide and a valve head on one end of said stem engageable with said valve seat to close said valve, means carried by said valve body for controlling closing movements of said valve to avoid impact of said head on said seat comprising an apertured boss on said valve body at the opposite side of said valve seat from said valve head and slidably receiving said valve stem, a cylindrical formation on said valve body surrounding said boss, a piston-receiving cylinder received in and detachably secured to said cylindrical formation, a piston secured on the end of said valve stem opposite said valve head and slidably received in said piston receiving cylinder, a pair of conduits connected between the interior of said cylinder and the interior of said valve body at the inlet side of said valve seat, a check valve in one of said conduits providing flow of liquid from said valve body at the inlet side of said valve seat into said cylinder but precluding return flow of liquid from said cylinder to said valve body, and a flow-restricting device in the other of said conduits providing flow of liquid at a restricted rate from said cylinder to said valve body, said flow-restricting device comprising a manually-adjustable plug valve.

WALLACE D. NUENEMANN.

REFERENCES CITED

The following references are of record in the file of this patent:

UNITED STATES PATENTS

| Number | Name | Date |
|---|---|---|
| 533,953 | Holly | Feb. 12, 1895 |
| 632,490 | Hemphill | Sept. 5, 1899 |
| 931,532 | Wainwright | Aug. 17, 1909 |
| 1,148,160 | Eynon | July 27, 1915 |
| 1,291,609 | Nichols | Jan. 14, 1919 |